United States Patent
Satchell, Jr. et al.

(10) Patent No.: US 8,128,736 B2
(45) Date of Patent: Mar. 6, 2012

(54) CARBON DIOXIDE PRODUCTION FOR ENHANCED OIL RECOVERY

(75) Inventors: Donald Prentice Satchell, Jr., Chatham, NJ (US); Frank R. Fitch, Bedminster, NJ (US); Satish S. Tamhankar, Scotch Plains, NJ (US)

(73) Assignee: Linde Aktiengesellschaft, Munich (DE)

(*) Notice: Subject to any disclaimer, the term of this patent is extended or adjusted under 35 U.S.C. 154(b) by 275 days.

(21) Appl. No.: 12/539,117

(22) Filed: Aug. 11, 2009

(65) Prior Publication Data

US 2011/0038783 A1    Feb. 17, 2011

(51) Int. Cl.
  *B01D 53/04* (2006.01)
  *B01J 20/06* (2006.01)
(52) U.S. Cl. .......... 95/138; 423/219; 423/437.1
(58) Field of Classification Search .......... 95/117, 95/129, 138, 143; 423/210, 219, 239.1, 437.1; 502/525
See application file for complete search history.

(56) References Cited

U.S. PATENT DOCUMENTS

| | | | |
|---|---|---|---|
| 4,363,361 A | 12/1982 | Madgavkar et al. | |
| 6,059,858 A * | 5/2000 | Lin et al. | 95/96 |
| 6,143,203 A | 11/2000 | Zeng et al. | |
| 6,361,584 B1 * | 3/2002 | Stevens et al. | 95/96 |
| 6,379,586 B1 | 4/2002 | Zeng et al. | |
| 6,464,955 B2 | 10/2002 | Zeng et al. | |
| 6,761,838 B2 | 7/2004 | Zeng et al. | |
| 7,070,752 B2 | 7/2006 | Zeng et al. | |
| 7,303,606 B2 | 12/2007 | Zeng et al. | |
| 7,347,887 B2 * | 3/2008 | Bulow et al. | 95/138 |
| 2004/0179986 A1 | 9/2004 | Burckhardt et al. | |

FOREIGN PATENT DOCUMENTS

| | | |
|---|---|---|
| CN | 1973962 A | 6/2007 |
| EP | 0 995 715 B1 | 4/2000 |
| EP | 1 052 219 B1 | 11/2000 |
| EP | 0 913 184 B1 | 4/2006 |
| JP | 11342337 A | 12/1999 |

OTHER PUBLICATIONS

Lake, Schmidt and Venuto, A Niche for Enhanced Oil Recovery in the 1990s, Oil Field Review—Jan. 1992, pp. 55-61.

* cited by examiner

*Primary Examiner* — Frank Lawrence, Jr.
(74) *Attorney, Agent, or Firm* — Philip H. Von Neida

(57) ABSTRACT

A method for producing carbon dioxide by the steps of feeding a $CO_2$-rich feed stream containing fuel gas to an oxygenated oxygen-selective ceramic bed to produce a product stream of carbon dioxide, water, and residual oxygen; adding oxygen to this product stream and feeding to an oxygen-depleted oxygen-selective ceramic bed and recovering carbon dioxide substantially free of oxygen and fuel gas. In an additional embodiment, nitrogen oxides are also removed from the fuel gas.

40 Claims, 3 Drawing Sheets

CARBON DIOXIDE PRODUCTION FOR ENHANCED OIL RECOVERY

BACKGROUND OF THE INVENTION

The invention relates to the production of a carbon dioxide stream for use in enhanced oil recovery (EOR). The carbon dioxide stream is substantially oxygen-free and fuel-free and is produced from the off gas from underground combustion processes. The invention will also provide for fuel gas streams where nitrogen oxides are also present. The off gas from underground combustion process for oil recovery from bitumen or coal deposits or other fuel gas containing carbon dioxide streams can be the feed gas stream. More particularly, the invention is used in fire flood operations in which oxygen is used as the oxidant with carbon dioxide recycle and a side stream is produced for use in EOR.

EOR applications typically require carbon dioxide concentrations greater than 90, preferably 95% with residual oxygen levels of less than 100 ppmv When air is used as the oxidant, the off gas from underground fire-flood operation contains only about 15% carbon dioxide together with about 2.5 to 10% of a gaseous fuel, 1% argon and the balance nitrogen on a dry basis as well as sulfur and nitrogen containing impurities derived from coal or oil. The gaseous fuel typically comprises hydrocarbons having from 1 to 6 carbons, carbon monoxide and hydrogen. When oxygen is used as the oxidant, with carbon dioxide recycle, the off gas contains much higher carbon dioxide levels up to about 70 to 85%. In each case, the residual oxygen level is low (not more than about 1%) and excess water and sulfur compounds must be removed before further treatment. Such low heating value streams may have been flared in the past, but this can be damaging environmentally because of the carbon dioxide contained therein and wasteful as no economic benefit is obtained from the fuel present in these streams.

Conventional approaches to remove fuel from the off gas involve adding excess quantities of oxygen before either thermally or catalytically combusting the fuels, optionally recovering at least some of the energy by the generation of steam and/or electricity. In the situation of an oxygen based fire flood, the carbon dioxide concentration is close to the requirements for EOR application after combustion of the fuel but the product then contains 1 to 4% residual oxygen. Although further oxygen may be added to this stream for re-injection into the fire flood operation, the residual oxygen must be removed before any of this stream can be used for EOR. This requires that either the carbon dioxide-containing stream be compressed and liquefied and the carbon dioxide purified up to 99% with some loss of carbon dioxide with the rejected oxygen and other low boiling gases or stoichiometric quantities of hydrogen or another fuel be added and the residual oxygen reacted to water over an De-Oxo catalyst such as palladium on alumina.

$NO_x$ removal requires oxidation of NO to $NO_2$ using a supported platinum group metal catalyst or aqueous ozone, followed by caustic scrubbing or selective catalytic reduction (SCR) with a reducing agent such as ammonia. These additional processes add complexity and cost.

Some earlier attempts at partial combustion of fuel from the off-gas from air fired fire flood operation have used platinum containing perovskite combustion catalysts. Sub-stoichiometric levels of oxygen were added to substantially remove the more readily oxidizable carbon monoxide, hydrogen and higher chain hydrocarbon components allowing a methane containing waste stream to be safely vented to the atmosphere. See, for example, U.S. Pat. No. 4,363,361.

A perovskite catalyst supported on a porous substrate has been described for the selective decomposition of $N_2O$ in the presence of $NO/NO_2$ at temperatures in the range of 700 to at least 1000° C. that is useful in nitric acid production as detailed in pending U.S. Patent Application Publication No. 2004/179,986.

Exhaust gas can have nitrogen oxides removed by a Pt-group metal containing perovskite catalyst. Exhaust gas containing the nitrogen oxides and steam contact the catalyst at temperatures of 600 to 1000° C. with or without oxygen present and with no reducing agents added without removing moisture from the exhaust gas. See, for example, JP 11342337.

Rare earth perovskite-type catalysts have been used for the catalytic oxidation of NO into $NO_2$. As described in CN 1973962, 80% oxidizing activity is seen at 300° C. Other perovskite catalysts containing metals selected from the group comprising Ru, Pd and Pt have been used for reducing and removing nitrogen oxides where carbon monoxide and unburnt hydrocarbons are present.

Conventional CAR processes have been used in the separation of oxygen and nitrogen from air; syngas production, and other partial oxidation processes. See for example, U.S. Pat. No. 6,059,858; EP 913,184 B1; U.S. Pat. No. 6,379,586; EP 995,715 B1; U.S. Pat. No. 6,761,838; U.S. Pat. No. 6,143,203; U.S. Pat. No. 6,464,955; EP 1,052,219 B1; U.S. Pat. No. 7,070,752; and U.S. Pat. No. 7,303,606.

Cyclic autothermal recovery (CAR) technology makes use of the oxygen "storage" property of perovskites at high temperature. This results in highly selective oxygen extraction from an oxygen containing feed gas, typically air. CAR is based on conventional pelletized materials and employs a cyclic steady state process. Each bed of the perovskite sorbent is alternately exposed to feed air and regeneration gas flows. In one mode, the partial pressure swing mode, using a sweep gas, enables, production of an oxygen-enriched stream for use in oxy-fuel combustion applications. In another mode of operation a fuel containing stream is contacted with the oxygenated perovskite sorbent, thereby generating synthesis gas (hydrogen and carbon monoxide) or other useful chemical products by the partial oxidation reactions or thermal energy by complete combustion of the fuel. Internal regenerative heat transfer is used to maintain the temperature of the perovskite material, the perovskite zone in each bed is sandwiched between two zones of heat transfer material.

Comparative Example 1

In prior CAR combustion processes, as illustrated in FIG. 1a, a feed gas comprising carbon monoxide, hydrogen, C1 to C6 hydrocarbons, oxygenates and mixtures of these components 1 is first fed at temperatures of 450° C. to 1000° C. through a bed of perovskite material A that is in its oxygenated state progressively transforming the perovskite material into its oxygen-depleted state. This feed gas will react with oxygen abstracted from the perovskite under conditions where it is fully oxidized to carbon dioxide and water 2. In the second step shown in FIG. 1b, air 3 is fed through the now oxygen-depleted bed A and oxygen is incorporated into the perovskite material thereby generating a nitrogen byproduct 4. Steam rinse steps may be used between these steps in order to remove residual process gases from the dead volume in the beds and associated process equipment. A continuous cyclic steady state process is realized when two or more beds are operated out of phase.

In order to maintain the temperature of the beds in the CAR process, the process feed and the air regeneration steps are normally conducted in counter-current directions with internal regenerative heat exchange.

In the counter-current mode, the perovskite material that is located at the exit end of the bed during the fuel combustion step is located at the entrance of the bed during the air regeneration step and hence is in equilibrium with the oxygen partial pressure in air at the end of that step. Excess oxygen must be used in order to ensure the complete oxidation of the fuel contained in the feed gas. Complete combustion must be achieved before the end of the bed in order to prevent fuel gas slippage into the product gas. Oxygen-slip into the product gas is hence inevitable in the conventional CAR complete combustion process.

Comparative Example 2

In the co-current embodiment of the conventional CAR technology, the separate process gas and regeneration streams used in the two main steps are directed in the same direction through the beds. This make it necessary to use external heat exchangers in order to heat the gas streams entering the beds versus those leaving the beds, but means that the portion of perovskite that has been fully oxygenated in the regeneration step is at the same end of the bed as that at which the fuel gas containing stream is fed during the fuel combustion step. If the beds have initially been depleted in oxygen, e. g., by flowing the fuel-gas stream through them to breakthrough, and the bed is then flushed with, for example steam, to remove residual fuel gas, then the product stream during the fuel combustion step can be made at the same time fuel gas-free and oxygen-free in the conventional cyclic steady state CAR process. However, since excess oxygen must be used in order to ensure the complete oxidation of the fuel contained in the feed gas, reaction of the excess oxygen with the depleted perovskite leads to oxygenation of the perovskite and progression of an oxygen front through the bed over many cycles until it breaks through into the product gas.

In contrast to conventional CAR technology, the invention maintains the outlet of the oxygen-selective ceramic bed oxygen depleted in order to continuously remove oxygen from the fuel-free carbon dioxide-rich product and at the same time allow for efficient heat exchange between the inlet and outlet process streams.

SUMMARY OF THE INVENTION

A method for producing carbon dioxide comprising the steps:
feeding a $CO_2$-rich feed stream containing fuel gas to a first oxygen-selective ceramic bed that is in its oxygenated state to produce a stream of carbon dioxide, water and residual oxygen, thereby progressively depleting said first oxygen selective ceramic bed in oxygen;
adding oxygen to the stream of carbon dioxide and water;
feeding said stream of oxygen, carbon dioxide and water to an second oxygen-selective ceramic bed that is in its oxygen-depleted state, thereby progressively oxygenating said second oxygen-selective ceramic bed; and
recovering carbon dioxide substantially free of oxygen and fuel gas.

The steps are cyclical and comprise reversing the flows of said carbon dioxide substantially free of oxygen and fuel and said carbon dioxide, water and residual oxygen. The cycle time ranges from 15 seconds to 6 hours, preferably from 5 minutes to 60 minutes and more preferably 10 to 30 minutes.

The fuel gas containing stream typically contains at least 35% $CO_2$, preferably at least 50% $CO_2$ and preferably at least 70% $CO_2$ by volume.

Residual fuel gas remaining at the end of the first step in the dead volume of the first bed as well as associated process equipment is preferably removed by flushing that bed with the minimum required volume of steam or product $CO_2$ before the flows of said carbon dioxide substantially free of oxygen and fuel and said carbon dioxide, water and residual oxygen are reversed.

There is typically substantially complete removal of the fuel gas component from the $CO_2$-rich feed stream in the oxygenated oxygen-selective ceramic bed and of oxygen in the oxygen-depleted oxygen-selective ceramic bed. The amount of oxygen added to the stream of carbon dioxide and water is approximately stoichiometric.

An oxidation reactor may also be employed where the stream of oxygen, carbon dioxide and water is fed to an oxidation reactor to complete oxidation of the fuel gas component prior to feeding to said oxygen-depleted oxygen-selective ceramic bed.

The fuel gas entering the oxygenated oxygen-selective ceramic bed is at a temperature of about 200 to 300° C.

The carbon dioxide substantially free of oxygen and fuel gas and/or nitrogen oxides leaving the oxygen-depleted oxygen-selective ceramic bed is at a temperature of about 200 to 300° C. Heat exchange between the fuel gas containing feed and product $CO_2$ streams is readily achieved using internal regenerative heat exchange beds located at the fuel-gas feed/pure $CO_2$ product ends of perovskite beds B and C.

The temperatures in the working parts of the perovskite beds are in the range 450° C. to 1200° C., more preferably 550 to 1050° C. Steam generation and/or compact gas-to-gas heat exchangers can be used to remove excess combustion heat from the intermediate product gas stream between the perovskite beds and, if necessary, from the final product stream.

The $CO_2$-rich feed stream containing fuel gas is from off gas from an oxygen-based fire flood operation but can be from any suitable source. The carbon dioxide produced by the methods of the present invention can be employed in EOR processes.

In addition to the oxygen and fuel that may be present in the carbon dioxide, nitrogen oxides may also be present. The residual nitrogen oxides can also be removed by the methods of this invention.

DETAILED DESCRIPTION OF THE INVENTION

Figure 2:
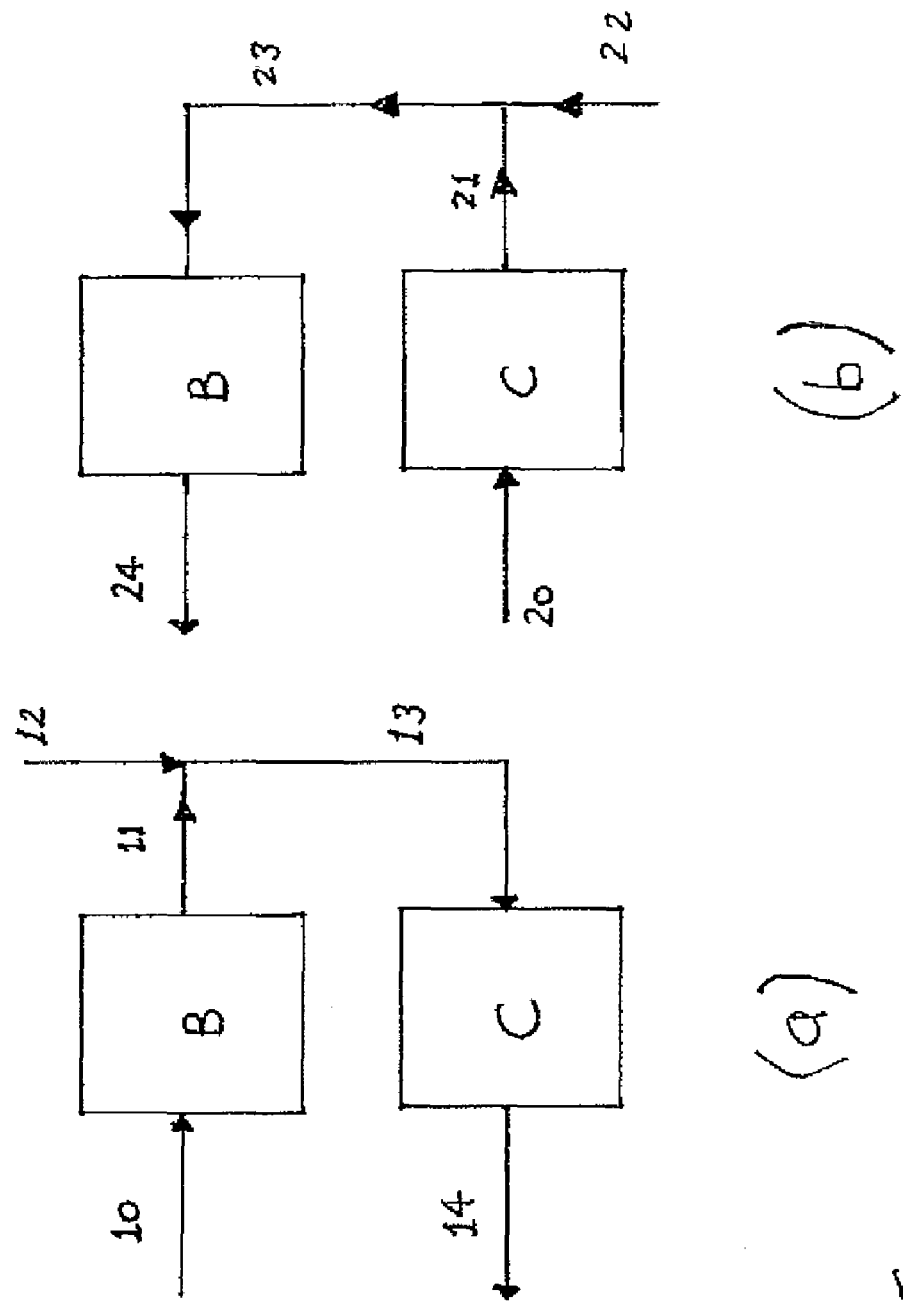
FIG. 2 is a schematic illustration of a CAR process according to the methods of the present invention.

As illustrated in FIG. 2, the invention utilizes a cyclic CAR-style process in which two oxygen-selective ceramic beds, which are typically perovskites are used cyclically, one being depleted in oxygen by the fuel containing feed gas whilst the other is regenerated by the excess oxygen remaining after the oxidation zone as well as additional oxygen added for this purpose.

Figure 1:
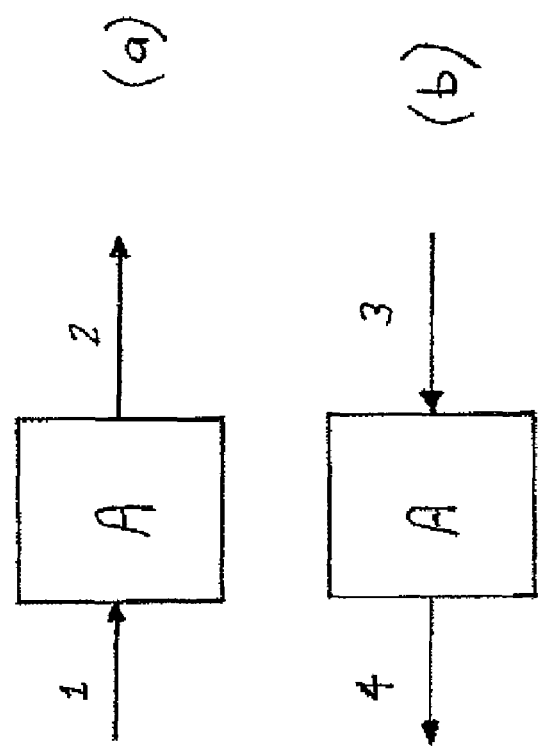
FIG. 1 is a schematic illustration of a conventional CAR combustion process.

In conventional reactive CAR processes, the fuel-gas containing feed stream flows through a first bed of oxygenated perovskite wherein a fuel is partially oxidized to useful chemical products or completely combusted to carbon dioxide and water thereby giving the first product stream. When this bed is depleted in oxygen, the fuel gas containing feed is stopped and air is fed through the bed to re-oxygenate the perovskite giving a second nitrogen-rich product stream. This cycle is shown in FIG. 1 where the counter-current direction of feed and regeneration steps are depicted in FIGS. 1(*a*) and 1(*b*). This cycle is different from that described herein because the cycle of the invention utilizes at least two oxygen-selective ceramic beds, one of which is in its oxygenated state and the other of which is in its oxygen-depleted state that are connected together in series during each part cycle.

In the invention according to FIG. 2(*a*), the $CO_2$-rich feed stream containing fuel-gas 10 flows through a first bed of an oxygenated oxygen-selective ceramic B which is preferably an oxygenated perovskite wherein the fuel is combusted to carbon dioxide and water thereby progressively depleting the oxygen-selective ceramic bed B and giving a fuel gas-free $CO_2$-rich feed first product stream 11 containing some residual oxygen. A nickel or platinum containing perovskite formulation is a preferred oxygen-selective ceramic in this combustion application. Oxygen 12 is added to this first stream and the mixture 13 is flowed directly through a second oxygen-selective ceramic bed of oxygen-depleted perovskite C which is preferably an oxygen-depleted perovskite wherein the oxygen progressively re-oxygenates the oxygen-depleted oxygen-selective ceramic perovskite bed C and gives a final product stream 14 that is both fuel gas and oxygen-depleted.

The flow direction through both beds is reversed before oxygen breaks through into the final product stream. This may be achieved by careful control of the cycle times and process conditions or by monitoring the oxygen level utilizing a high temperature oxygen sensor e.g., Yttria-Stabilized Zirconia (YSZ), mounted at a point near to the outlet of the bed. This is illustrated in FIG. 2 (*b*). The $CO_2$-rich feed stream containing fuel-gas 20 now is now directed through the now oxygenated bed of oxygen-selective ceramic C wherein the fuel is combusted to carbon dioxide and water thereby progressively depleting the oxygen-selective ceramic bed C and giving a fuel gas-free $CO_2$-rich feed first product stream 21 containing some residual oxygen. Oxygen 22 is added to this first stream and the mixture 23 is flowed directly through a the now oxygen depleted oxygen-selective ceramic bed B wherein the oxygen progressively re-oxygenates the oxygen-depleted oxygen-selective ceramic perovskite bed B and gives a final product stream 24 that is both fuel gas and oxygen-depleted. By reversing the flows through the system of two beds at appropriate cycle times in the range 15 to seconds to 6 hours, preferably 5 minutes to 1 hour, more preferably 10 to 30 minutes, a continuous process is achieved. Embodiments in which multiple sets of beds are operated either in phase or out-of-phase are contemplated.

The amount of oxygen added and the cycle time are adjusted to ensure complete removal of the fuel gas component in the $CO_2$-rich feed in the first bed and of residual oxygen in the second bed. In this way stoichiometric quantities of oxygen are utilized. The oxygen capacity of the perovskite gives a buffer against fluctuations in the fuel content of the feed.

Residual fuel gas remaining at the end of the first step in the dead volume of the first bed as well as associated process equipment is preferably removed by flushing that bed with the minimum required volume of steam or product $CO_2$ before the flows of said carbon dioxide substantially free of oxygen and fuel and said carbon dioxide, water and residual oxygen are reversed. If this flush step is omitted a small quantity of fuel gas will pass into the product $CO_2$ stream during flow reversal. In some circumstances it may be operationally simpler or necessary to flush both beds and the associated equipment between part cycles.

Figure 3:
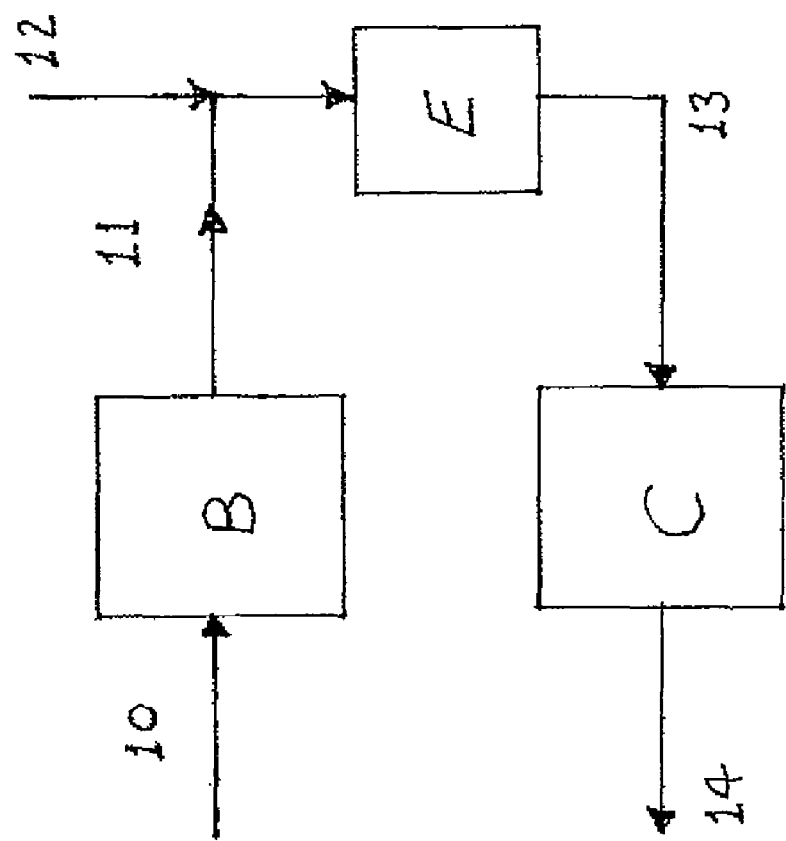
FIG. 3 is a schematic illustration of a CAR process according to the methods of the present invention with an oxidation reactor.

As indicated in FIG. 3, which shares the same designations for feed streams and perovskite beds as FIG. 2, an optional oxidation reactor E can be located between the two perovskite beds in order to reduce the sizes of the perovskite beds, to further balance the thermal and mass-balance requirements of the reaction and regeneration steps, and to ensure substantially complete combustion of the fuel-gas component in the $CO_2$-rich feed stream. In this case, the fuel gas component in the $CO_2$-rich feed stream is only partly converted in the first perovskite bed. Cycle times of the order of 5 minutes to 1 hour more preferably 10 to 30 minutes in duration are preferred, although cycle times as short as 15 seconds or as long as 6 hours can be employed.

The process of this invention addresses the problems associated with the prior counter-current (oxygen slippage) and co-current CAR processes (heat exchange). Not only can both a $CO_2$-rich feed stream containing fuel gas and oxygen free product gas be produced in a pseudo-continuous process without intermittent bed depletion steps, but heat exchange between the fuel gas containing feed and product $CO_2$ streams is readily achieved using internal regenerative heat exchange beds located at the fuel-gas feed/pure $CO_2$ product ends of perovskite beds B and C. The use of internal regenerative heat exchange, together optionally with the use of compact gas-to-gas heat exchangers and/or the generation of steam makes it possible to heat the feed to about 200° to 300° C. against the product gas in order to initiate the combustion reaction to 500° to 800° C. whilst at the same time cooling the product stream to about 200° to 300° C. Steam generation and/or compact gas-to-gas heat exchangers can be used to remove excess combustion heat from the intermediate product gas stream between the perovskite beds and, if necessary, from the final product stream. Excess combustion heat contained within the perovskite bed at the end of the combustion step is removed during the oxygenation step, if necessary by prolonging this step.

When nitrogen oxides are also present in the carbon dioxide rich feed stream 10, a fuel-free first product stream 11 containing some residual oxygen and nitrogen oxides is formed in the first oxygenated oxygen-selective ceramic bed B. NO will be fully or partially transformed to $NO_2$ depending upon the composition of the perovskite. Ni or Pt-Group metal containing perovskite formulations are preferred for the oxygen-selective ceramic. Oxygen 12 is added to this first stream and this mixture 13 flows directly through a second oxygen-selective ceramic bed C of oxygen depleted perovskite. The oxygen progressively re-oxygenates the oxygen-depleted perovskite bed and $NO_x$ as well as $N_2O$ are decomposed to nitrogen and oxygen the latter of which will react with the depleted perovskite. This will yield a final $CO_2$-rich product stream 14 that is fuel gas, oxygen and $NO_x$ depleted.

The flow direction through both oxygen-selective ceramic beds is reversed before oxygen breaks through into the final product stream as indicated by a high temperature oxygen sensor, e.g., Yttria-Stabilized Zirconia (YSZ), mounted at a point near to the outlet of the oxygen-selective ceramic bed. The amount of oxygen added and the cycle time are adjusted to ensure complete removal of the fuel gas in the first oxygen-selective ceramic bed and of residual oxygen and NOx in the second oxygen-selective ceramic bed. In this way stoichiometric quantities of oxygen are use and the oxygen capacity of the perovskite in the oxygen-selective ceramic bed gives a buffer against fluctuation in the concentrations of fuel gas and NOx in the $CO_2$-rich feed gas stream.

As indicated in FIG. 3, which shares the same designations for feed streams and perovskite beds as FIG. 2, an optional oxidation reactor E can be located between the two perovskite beds in order to reduce the sizes of the perovskite beds, to further balance the reaction and regeneration needs and to ensure substantially complete combustion of the fuel-gas component and oxidation of NOx in the $CO_2$-rich feed stream. In this case, only partial conversion of the fuel-gas and NOx components in the $CO_2$-rich feed stream containing fuel gas is achieved in the first perovskite bed. Cycle times of the order of 5 minutes to 1 hour, more preferably 10 minutes to 30 minutes in duration are preferred, although cycle times as short as 15 seconds or as long as 6 hours can be employed.

The oxygen-selective ceramic materials are typically oxygen-selective mixed conductors, which exhibit both high electronic and oxygen ionic conductivities at elevated temperature. Examples of these mixed conductors are perovskite-type oxides, $CeO_2$-based oxides, $Bi_2O_3$-based oxides, $ZrO_2$-based oxides, and brownmillerite oxides. In order to further enhance its electronic conductivity and catalytic activity for oxygen ionization, some metal phase can be added into the ceramic material to form a ceramic-metal composite. The metals can be selected from Cu, Ni, Fe, Pt, Pd, Rh Ru and Ag.

In general, the oxygen-selective ceramic materials retain oxygen through conduction of oxygen ions and filling up the oxygen vacancies in its bulk phase. The oxygen retention capacity usually increases with increasing oxygen partial pressure and decreasing temperature. Therefore, the retention and release of oxygen into and from the ceramic material during retention and release steps perform efficiently in that the oxygen partial pressure during the retention step is much higher than that in the release step.

In a preferred embodiment, the oxygen-selective ceramic material comprises an oxygen-selective mixed ionic and electronic conductor. In a more preferred embodiment, the oxygen-selective ceramic material comprises a perovskite-type ceramic having the structural formula $A_{1-x}M_xBO_{3-\delta}$, where A is an ion of a metal of Groups 3a and 3b of the periodic table of elements or mixtures thereof; M is an ion of a metal of Groups 1a and 2a of the periodic table or mixtures thereof; B is an ion of a d-block transition metal of the periodic table or mixtures thereof; x varies from >0 to 1; and $\delta$ is the deviation from stoichiometric composition resulting from the substitution of ions of metals of M for ions of metals of A.

In a more preferred embodiment, the at least one oxygen-selective ceramic material is a perovskite-type ceramic and x varies from about 0.1 to 1.

In another more preferred embodiment, the at least one oxygen-selective ceramic material is a perovskite-type ceramic and A is one or more f-block lanthanides. In a more preferred embodiment, A is La, Y, Sm or mixtures thereof.

In another more preferred embodiment, the at least one oxygen-selective ceramic material is a perovskite-type ceramic and M is at least one metal of Group 2a of the periodic table of elements. In a more preferred embodiment M is Sr, Ca, Ba or mixtures thereof.

In another more preferred embodiment, the at least one oxygen-selective ceramic material is a perovskite-type ceramic and B is Ti, V, Cr, Mn, Fe, Co, Ni, Cu, Zn or mixtures thereof. In a more preferred embodiment, B is V, Fe, Ni, Cu or mixtures thereof.

In another more preferred embodiment, the oxygen-selective ceramic material is a perovskite-type ceramic and x is about 0.2 to 1.

In another more preferred embodiment, the oxygen-selective ceramic material is a perovskite-type ceramic and A is La, Y, Sm or mixtures thereof, M is Sr, Ca or mixtures thereof, and B is V, Fe, Ni, Cu or mixtures thereof.

In another embodiment, the oxygen-selective ceramic material conductor is a member selected from the group consisting of (1) ceramic substances selected from the group consisting of $Bi_2O_3$, $ZrO_2$, $CeO_2$, $ThO_2$, $HfO_2$ and mixtures thereof, the ceramic substances being doped with CaO, rare earth metal oxides or mixtures of these; (2) brownmillerite oxides; and (3) mixtures of these.

In another embodiment, the oxygen-selective ceramic material conductor is at least one ceramic substance selected from the group consisting of $Bi_2O_3$, $ZrO_2$, $CeO_2$, $ThO_2$, $HfO_2$ and mixtures of these, and the at least one ceramic substance is doped with a rare earth metal oxide selected from the group consisting of $Y_2O_3$, $Nb_2O_3$, $Sm_2O_3$, $Gd_2O_3$ and mixtures of these.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for producing carbon dioxide comprising the steps:
   a) feeding a $CO_2$-rich feed stream containing fuel gas to a first oxygen-selective ceramic bed that is in its oxygenated state to produce a stream of carbon dioxide, water and residual oxygen;
   b) adding oxygen to said stream of carbon dioxide and water;
   c) feeding said stream of oxygen, carbon dioxide and water to a second oxygen-selective ceramic bed that is in its oxygen-depleted state; and
   d) recovering carbon dioxide substantially free of oxygen and fuel gas.

2. The method as claimed in claim 1 wherein step a) progressively depletes said first oxygen-selective ceramic bed in oxygen.

3. The method as claimed in claim 1 wherein step c) progressively oxygenates said second oxygen-selective ceramic bed.

4. The method as claimed in claim 1 wherein the steps are cyclical.

5. The method as claimed in claim 4 wherein said cyclical steps comprise reversing the flows of said carbon dioxide substantially free of oxygen and $CO_2$-rich feed stream containing fuel gas and said carbon dioxide, water and residual oxygen.

6. The method as claimed in claim 5 wherein said first oxygen-selective ceramic bed is flushed with a gas selected from the group consisting of steam and product carbon dioxide to remove residual fuel gas from void spaces before said flow reversal.

7. The method as claimed in claim 1 wherein there is complete removal of said fuel gas in said oxygenated perovskite bed and oxygen in said oxygen-depleted oxygen-selective ceramic bed.

8. The method as claimed in claim 1 wherein the amount of said oxygen added to said stream of carbon dioxide and water is stoichiometric.

9. The method as claimed in claim 1 further comprising feeding said stream of oxygen, carbon dioxide and water to an oxidation reactor prior to feeding to said oxygen-depleted oxygen-selective ceramic bed.

10. The method as claimed in claim 1 further comprising feeding said stream of oxygen, carbon dioxide and water to heat exchange means to reduce the temperature of said stream prior to feeding to said oxygen-depleted oxygen-selective bed.

11. The method of claim 10 wherein said heat exchange means comprises a steam generator.

12. The method as claimed in claim 1 wherein said oxygen-selective ceramic is a perovskite.

13. The method as claimed in claim 4 wherein said cycle time ranges from 15 seconds to 6 hours.

14. The method as claimed in claim 4 wherein said cycle time ranges from 20 minutes to 60 minutes.

15. The method as claimed in claim 4 wherein said cycle time ranges from 10 minutes to 30 minutes.

16. The method as claimed in claim 1 wherein said $CO_2$-rich feed stream containing fuel gas is at a temperature of about 200 to 300° C.

17. The method as claimed in claim 1 wherein said carbon dioxide substantially free of oxygen and $CO_2$-rich feed stream containing fuel gas is at a temperature of about 200 to 300° C.

18. The method of claim 17 wherein said CO2-rich feed stream containing fuel gas is heated versus said carbon dioxide stream substantially free of oxygen using regenerative heat exchange.

19. The method as claimed in claim 1 wherein said $CO_2$-rich feed stream containing fuel gas is from off gas from an oxygen-based fire flood operation.

20. The method as claimed in claim 1 wherein said carbon dioxide is used in an enhanced oil recovery process.

21. A method for producing carbon dioxide comprising the steps:
   a) feeding a $CO_2$-rich feed stream containing fuel gas to a first oxygen-selective ceramic bed that is in its oxygenated state to produce a stream of carbon dioxide, water and residual oxygen and residual nitrogen oxides;
   b) adding oxygen to said stream of carbon dioxide and water;
   c) feeding said stream of oxygen, carbon dioxide and water to a second oxygen-selective ceramic bed that is in its oxygen-depleted state; and
   d) recovering carbon dioxide substantially free of oxygen, nitrogen oxides and fuel gas.

22. The method as claimed in claim 21 wherein step a) progressively depletes said first oxygen-selective ceramic bed in oxygen.

23. The method as claimed in claim 21 wherein step c) progressively oxygenates said second oxygen-selective ceramic bed.

24. The method as claimed in claim 21 wherein the steps are cyclical.

25. The method as claimed in claim 22 wherein said cyclical steps comprise reversing the flows of said carbon dioxide substantially free of oxygen and $CO_2$-rich feed stream containing fuel gas and said carbon dioxide, water and residual oxygen.

26. The method as claimed in claim 22 wherein the first oxygen-selective ceramic bed is flushed with a gas selected from the group consisting of steam and product carbon dioxide to remove residual fuel gas from void spaces before said flow reversal.

27. The method as claimed in claim 21 wherein there is complete removal of said fuel gas in said oxygenated oxygen-selective ceramic bed and oxygen in said oxygen-depleted oxygen-selective ceramic bed.

28. The method as claimed in claim 21 wherein the amount of said oxygen added to said stream of carbon dioxide and water is stoichiometric.

29. The method as claimed in claim 21 further comprising feeding said stream of oxygen, carbon dioxide and water to an oxidation reactor prior to feeding to said oxygen-depleted oxygen-selective ceramic bed.

30. The method as claimed in claim 21 further comprising feeding said stream of oxygen, carbon dioxide and water to heat exchange means to reduce the temperature of said stream prior to feeding to said oxygen-depleted oxygen-selective bed.

31. The method of claim 30 wherein said heat exchange means comprises a steam generator.

32. The method as claimed in claim 21 wherein said oxygen-selective ceramic is a perovskite.

33. The method as claimed in claim 24 wherein said cycle time ranges from 15 seconds to 6 hours.

34. The method as claimed in claim 24 wherein said cycle time ranges from 5 minutes to 60 minutes.

35. The method as claimed in claim 24 wherein said cycle time ranges from 10 minutes to 30 minutes.

36. The method as claimed in claim 21 wherein said fuel gas is at a temperature of about 200 to 300° C.

37. The method as claimed in claim 21 wherein said carbon dioxide substantially free of oxygen and $CO_2$-rich feed stream containing fuel gas is at a temperature of about 200 to 300° C.

38. The method of claim 37 wherein said CO2-rich feed stream containing fuel gas is heated versus said carbon dioxide stream substantially free of oxygen using regenerative heat exchange.

39. The method as claimed in claim 21 wherein said fuel gas is from off gas from an oxygen-based fire flood operation.

40. The method as claimed in claim 21 wherein said carbon dioxide is used in an enhanced oil recovery process.

* * * * *